United States Patent [19]
Mione

[11] Patent Number: 6,095,309
[45] Date of Patent: Aug. 1, 2000

[54] CYCLE HANDLEBAR ACTUATOR

[75] Inventor: Walter Mione, Scarborough, Canada

[73] Assignee: At Design Inc., Scarborough, Canada

[21] Appl. No.: 09/190,163

[22] Filed: Nov. 12, 1998

[51] Int. Cl.[7] .............................. B62K 11/14; B62L 3/02; B62M 25/04
[52] U.S. Cl. ..................... 192/217; 74/110; 74/473.14; 74/422; 74/489; 74/502
[58] Field of Search .............. 74/488, 489, 110, 74/422, 502, 473.14; 192/217

[56] References Cited

U.S. PATENT DOCUMENTS

| | | | |
|---|---|---|---|
| 2,905,017 | 9/1959 | Randolph | 74/489 |
| 5,094,322 | 3/1992 | Casillas | 74/489 X |
| 5,315,891 | 5/1994 | Tagawa | 74/489 |
| 5,481,934 | 1/1996 | Tagawa | 74/489 X |
| 5,678,455 | 10/1997 | Watarai | 74/489 X |
| 5,850,761 | 12/1998 | Sugimoto | 74/489 |

FOREIGN PATENT DOCUMENTS

| | | |
|---|---|---|
| 4400641 | 3/1995 | Germany . |
| 4418717 | 12/1995 | Germany . |
| WO 95/07836 | 3/1995 | WIPO . |

*Primary Examiner*—Allan D. Herrmann
*Attorney, Agent, or Firm*—Ingrid E. Schmidt

[57] ABSTRACT

An actuator for actuating a derailleur and/or a brake of a bicycle. The actuator is incorporated into a bar end and includes a lever slidably mounted to the bar end for sliding between a neutral position and an actuating position axially spaced from the neutral position. A transmission mechanism is received within a cavity of the bar end and couples the lever to the brake or derailleur. The transmission mechanism actuates the brake or derailleur when the lever is slid to the actuating position.

7 Claims, 13 Drawing Sheets

6,095,309

1

CYCLE HANDLEBAR ACTUATOR

FIELD OF THE INVENTION

The present invention relates to cycles and, more particularly, to actuators for attachment to a cycle handlebar for operating a cycle brake and/or a cycle derailleur.

BACKGROUND OF THE INVENTION

Cycles include bicycles, tricycles, tandem bicycles, and mopeds. Many cycles, such as mountain bicycles, are equipped with handlebar systems, each of which include a central, generally outwardly-extending portion to be referred to herein as handlebars, and handlebar extensions connected to respective outer ends of the handlebars to be hereinafter referred to as bar ends.

Such handlebar systems allow for generally two riding positions. A first position entails gripping the handlebars to achieve superior steering control and enhanced riding stability. A second position entails placing the hands on the bar ends to obtain increased leverage when ascending hills, as well as a more comfortable riding position when cycling across level terrain.

Conventional brake and shift levers are commonly mounted to the handlebars allowing for quick and convenient braking or shifting when the hands are gripping the handlebars but not when the hands are grasping the bar ends. In the latter position, balance, control, response time, and hence rider safety, are compromised by the need to remove a hand from a bar end to reach a desired brake or shift lever on a handlebar.

U.S. Pat. No. 5,094,322 to Casillas shows brake levers mounted to both a bar end and a handlebar, thereby allowing for convenient and safe braking in any cycling position. However, the problem of shifting gears when riding with the hands on the bar ends is not addressed.

U.S. Pat. No. 5,678,455 to Watarai and U.S. Pat. No. 5,315,891 to Tagawa show shifting devices mounted to a bar end and a handlebar respectively; however, the problem of braking when the hands are gripping the bar ends is not addressed.

There is therefore a need to provide a new and improved actuator which, in accordance with one of its aspects, is adapted to actuate a cycle brake and a cycle derailleur, and which, in accordance with another of its aspects, is mountable to a bar end of a conventional cycle so that convenient and safe braking and shifting can be achieved in any cycling position.

SUMMARY OF THE INVENTION

The invention provides an actuator for actuating a cycle speed change member consisting of a derailleur or a brake. The actuator is incorporated into a generally cylindrical elongate member which is adapted to form part of a cycle handlebar system. The elongate member has a cavity, first and second ends, and a longitudinal axis extending between the first and second ends. The actuator includes an operating device slidably mounted to the elongate member for sliding between a neutral position and an actuating position axially spaced from the neutral position, and further includes a transmission mechanism received within the cavity of the elongate member, coupled to the operating device, and adapted to be coupled to a speed change member. The transmission mechanism is further adapted to actuate the speed change member when the operating device is in the actuating position.

2

BRIEF DESCRIPTION OF THE DRAWINGS

Preferred embodiments of the invention will now be described with reference to the drawings in which.

DESCRIPTION OF THE PREFERRED EMBODIMENTS

In the present specification, directional indicators including the words "right", "left", "forward", "rearward", "upper", and "lower", are used with reference to the bicycle and shall not be construed as limiting the scope of the invention as hereinafter claimed.

Figure 1:
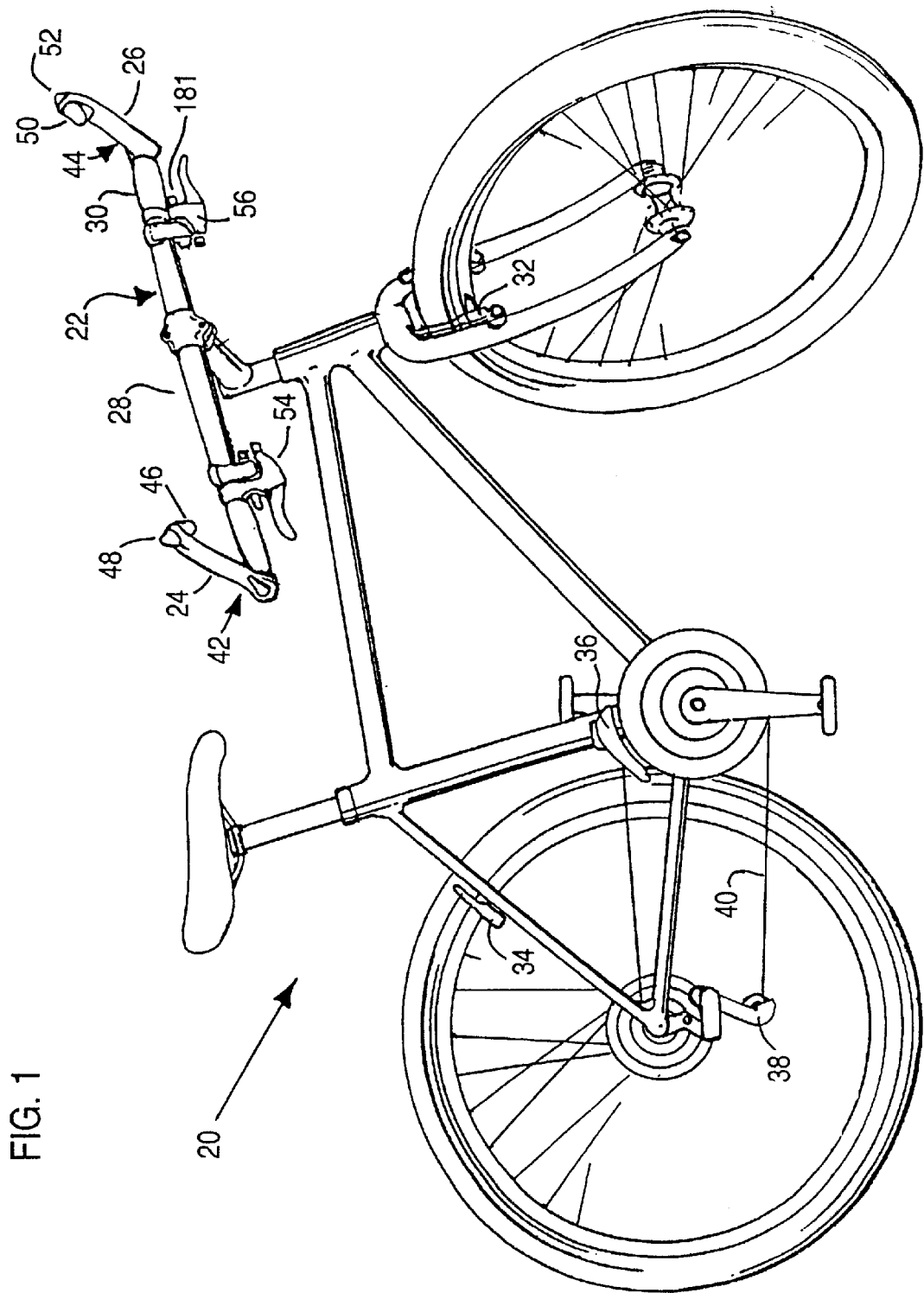
FIG. 1 is a simplified perspective view of a bicycle to which are mounted a pair of actuators according to a first embodiment of the invention, the actuators being incorporated into respective bar ends of a handlebar system of the bicycle.

Referring to FIG. 1, a bicycle designated generally by reference numeral 20 is shown. The bicycle 20 includes a handlebar system designated generally by numeral 22 which includes forwardly-extending generally cylindrical elongate members in the form of right and left bar ends 24, 26 and outwardly-extending right and left handlebars 28, 30. The bicycle 20 is equipped with cycle speed change members in the form of conventional front and rear brakes 32, 34 and front and rear derailleurs 36, 38. The derailleurs 36, 38 operate a conventional chain 40 to change gears.

Right and left actuators according to a first preferred embodiment of the invention and designated generally by reference numerals 42, 44, respectively, for actuating the brakes 32, 34 and derailleurs 36, 38, are incorporated into respective bar ends 24, 26, in a manner as will be described. The right actuator 42 includes operating devices in the form of a thumb-operated brake lever 46 for actuating the rear brake 34 and a thumb-operated shift lever 48 for downshifting rear derailleur 38. Similarly, left actuator 44 includes operating devices in the form of a thumb-operated brake lever 50 for actuating the front brake 32 and a thumb-operated shift lever 52 for downshifting the front derailleur 36. It should be noted that, in this embodiment, no provision is made for upshifting.

The actuators 42, 44 permit convenient braking and downshifting when a cyclist's hands are on the bar ends 24, 26. When the hands are on the handlebars 28, 30, braking and shifting may be conveniently accomplished using Shimano XTR™ brake and shift lever units 54, 56 mounted on respective handlebars 28, 30. Thus braking and downshifting may be achieved safely and conveniently in any riding position.

The left actuator 44 which is similar to the right actuator 42 will now be described in detail.

Figure 2:
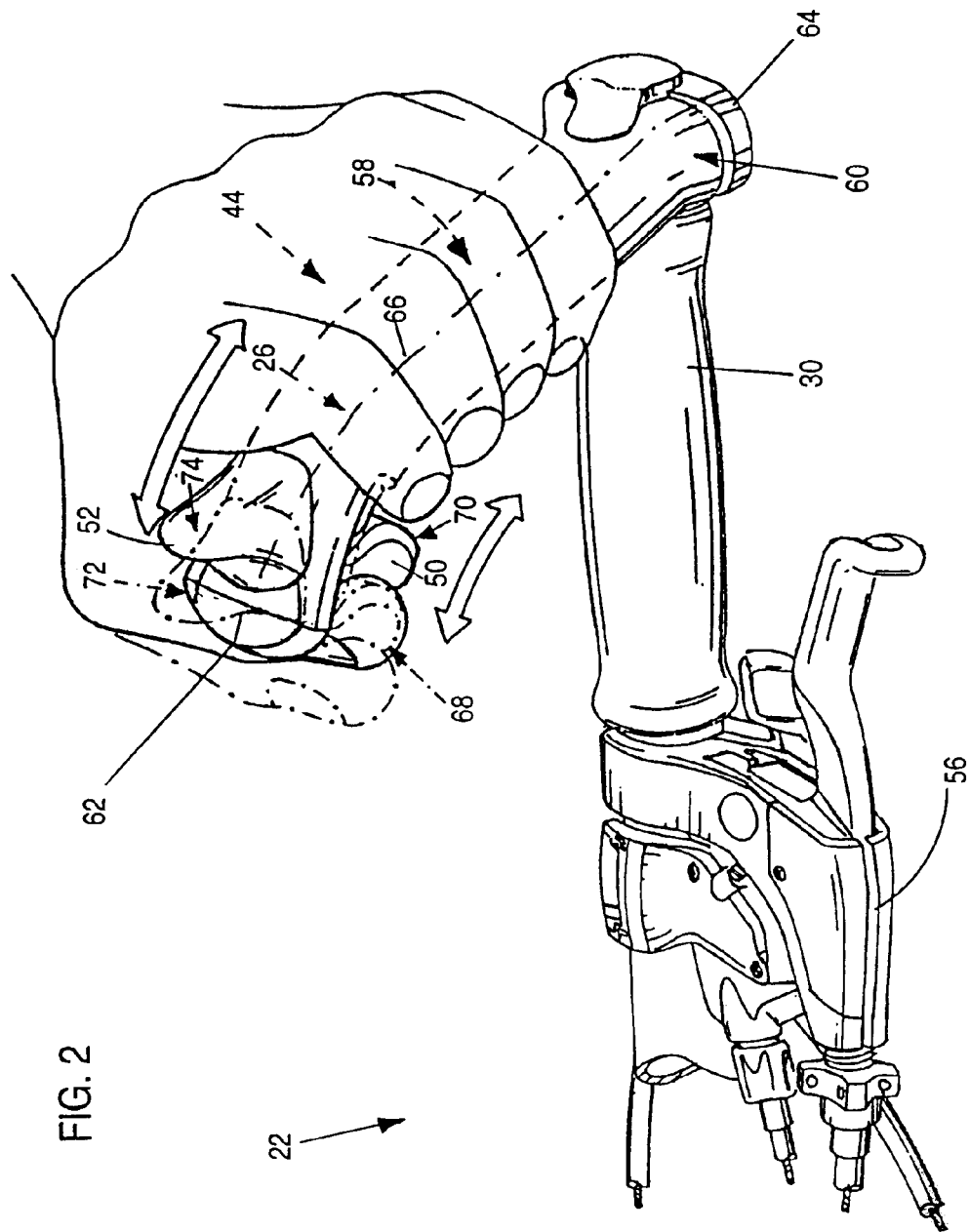
FIG. 2 is a partial perspective view of the handlebar system showing a left actuator being operated by a thumb of a rider.

FIG. 2 shows a hand operating the left actuator 44. The bar end 26 includes a grip portion 58 including a forward first end 62 of the bar end 26. Integrally formed with the grip portion 58 is a handlebar attachment portion 60 designed to receive an outer end of the left handlebar 30 as will be described below, and which includes a rearward second end 64 of the bar end 26. A longitudinal axis 66 extends between the first and second ends 62, 64. The brake lever 50 is slidably mounted to the grip portion 58 for sliding between a brake neutral position 68 at the first end 62 and a brake actuating position 70 spaced from the neutral position 68 along axis 66 of the grip portion 58. A brake transmission mechanism, to be described below, is received within a cavity of the bar end 26 and coupled to each of the brake lever 50 and to the front brake 32. The brake transmission mechanism is adapted to actuate the front brake 32 (FIG. 1) when the thumb brake lever 50 is in the brake actuating position 70.

Similarly, the thumb shift lever 52 is slidably mounted to the grip portion 58 for sliding between a shift neutral position 72 at the first end 62 and a shift actuating position 74 axially spaced from the shift neutral position 72. A shift transmission mechanism, also to be described below, is received within the cavity of the bar end 26 and is coupled to the thumb shift lever 52 and to the front derailleur 36, being adapted to downshift the front derailleur 36 when the shift lever 52 is in the shift actuating position 74.

The left actuator 44 will now be described in more detail with reference mainly to FIG. 3 but with reference also to other figures, as required.

Figure 3:
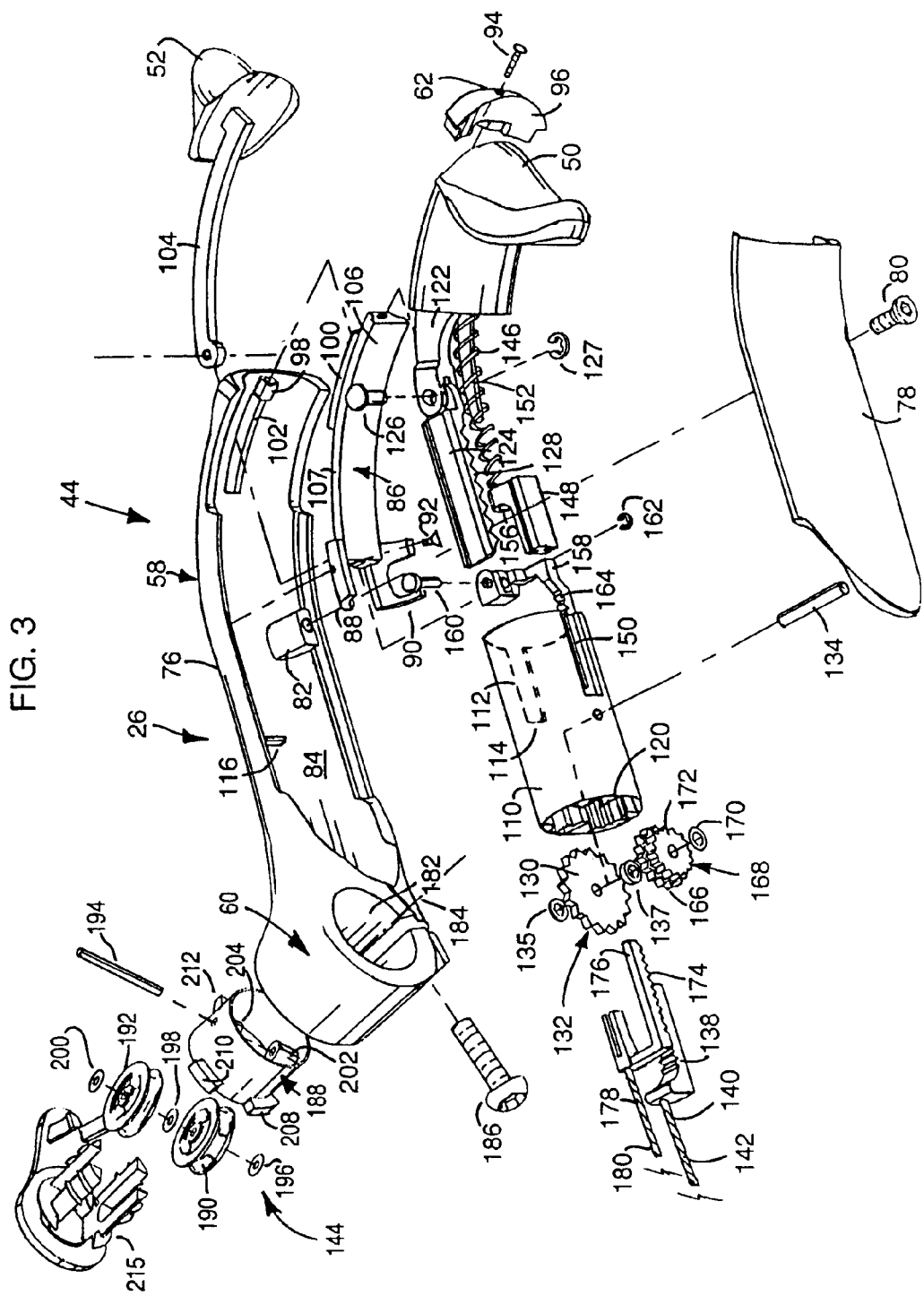
FIG. 3 is an exploded perspective view of the left actuator as seen from an inner side.

FIG. 3 shows the left actuator 44 in an exploded view to reveal internal components, including the brake and shift transmission mechanisms. In order to provide a frame of reference for the moving parts, some parts which remain fixed in location within the grip portion 58 will first be described.

The bar end 26 includes a two-piece housing for containing the internal components. The housing has an outer housing member 76 and an inner housing member 78 which is secured to the outer housing member 76 using a threaded bolt 80. The bolt 80 is received by a complimentary threaded retainer 82 attached to an inner surface 84 of the outer housing member 76.

A guide rail designated generally by reference numeral 86 for guiding the motion of thumb brake lever 50 and thumb shift lever 52 axially along the grip portion 58 is attached securely to the outer housing member 76 with wings 88, 90 of the guide rail 86 lying flush against the inner surface 84. The guide rail 86 is attached using a screw 92 which extends through the upper wing 88 into the outer housing member 76. The attachment is reinforced by a screw 94 which attaches an end bearing 96 to the guide rail 86, and the guide rail 86 to a screw receiver 98 formed integrally with the inner surface 84 adjacent to a forward end of the outer housing member 76.

Figure 7:
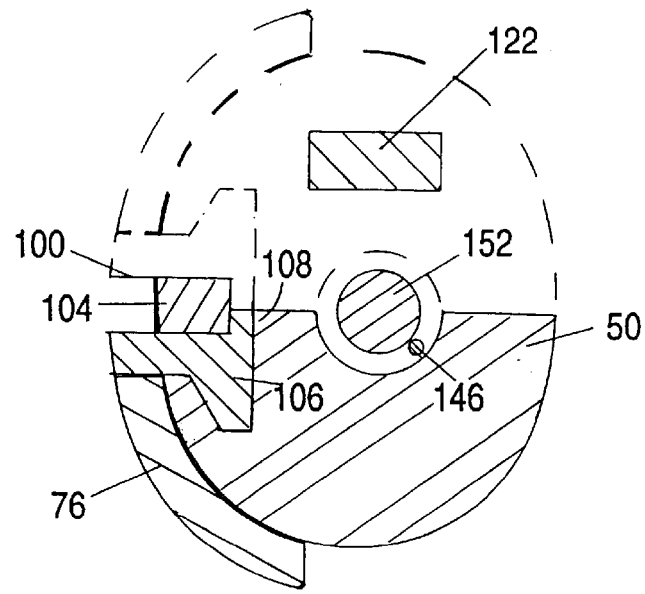
FIG. 7 is a section of the actuator taken along line 7—7 of FIG. 6.

A forward guide portion of the guide rail 86 includes a shift lever guide 100 formed on an outer side thereof which extends through a slot 102 of outer housing member 76 and receives and guides a shift lever arm 104 of the shift lever 52. An inner side of the guide portion of the guide rail 86 defines a brake lever guide 106 having a T-shaped cross-section (see also FIG. 7). The thumb brake lever 50 is provided with a complementary T-shaped recess 108 (see FIGS. 4 and 7) for slidably receiving the brake lever guide 106. Thus, the shift lever 52 and brake lever 50 slide along and are guided by respective guides 100 and 106 of the guide rail 86 between the respective neutral positions 72, 68 and respective actuating positions 74, 70.

Figure 6:
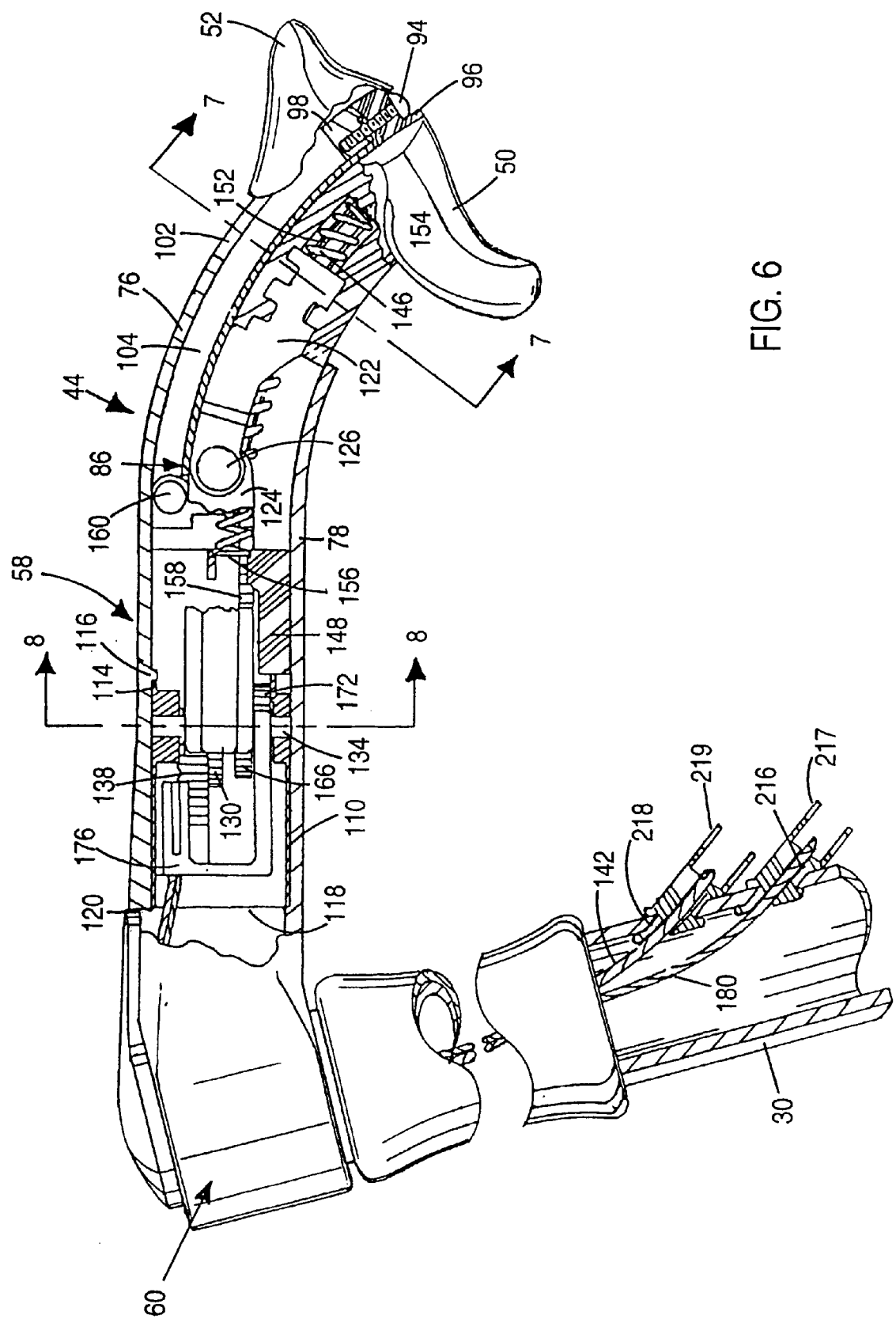
FIG. 6 is a top view of part of the handlebar system, partially sectioned and with portions broken away to show internal structure.

A gear cartridge 110 for housing and/or guiding components of the shift and brake transmission mechanisms is sandwiched between inner and outer housing members 76, 78 such that movement of the gear cartridge 110 within the grip portion 58 is restricted. The gear cartridge 110 includes a left slot 112 having a slot end 114 abutting against a stop 116 formed integrally with inner surface 84 of outer housing member 76 such that forward travel of gear cartridge 110 within the grip portion 58 is further restricted. Referring to FIG. 6, rearward travel of the gear cartridge 110 is also further restricted by an annular abutment 118 of the grip portion 58 which is engaged by a rearward end 120 of the gear cartridge 110.

The operation of the brake lever 50 and brake transmission mechanism to cause braking of front brake 32 will now be described with reference mainly to FIGS. 3 and 4.

The brake lever 50 includes an integral rearwardly-extending brake lever arm 122 having a rearward end attached to the brake transmission mechanism which is in the form of a rack and pinion system. The rack and pinion system includes a first rack in the form of an upper brake rack 124 to which the brake lever arm 122 is pivotally attached by means of a pivot pin 126 and a pin retaining clip 127.

The upper brake rack 124 is slidable longitudinally within the gear cartridge 110 along corresponding inner guides (shown in section in FIG. 8) provided on an inner surface of the gear cartridge 110. Downwardly depending teeth 128 of the upper brake rack 124 cooperate with a large diameter brake pinion 130 of a brake step-down pinion assembly designated generally by reference numeral 132 rotatably mounted between bushings 135, 137 on a pinion pin 134 extending through the gear cartridge 110.

Figure 4:
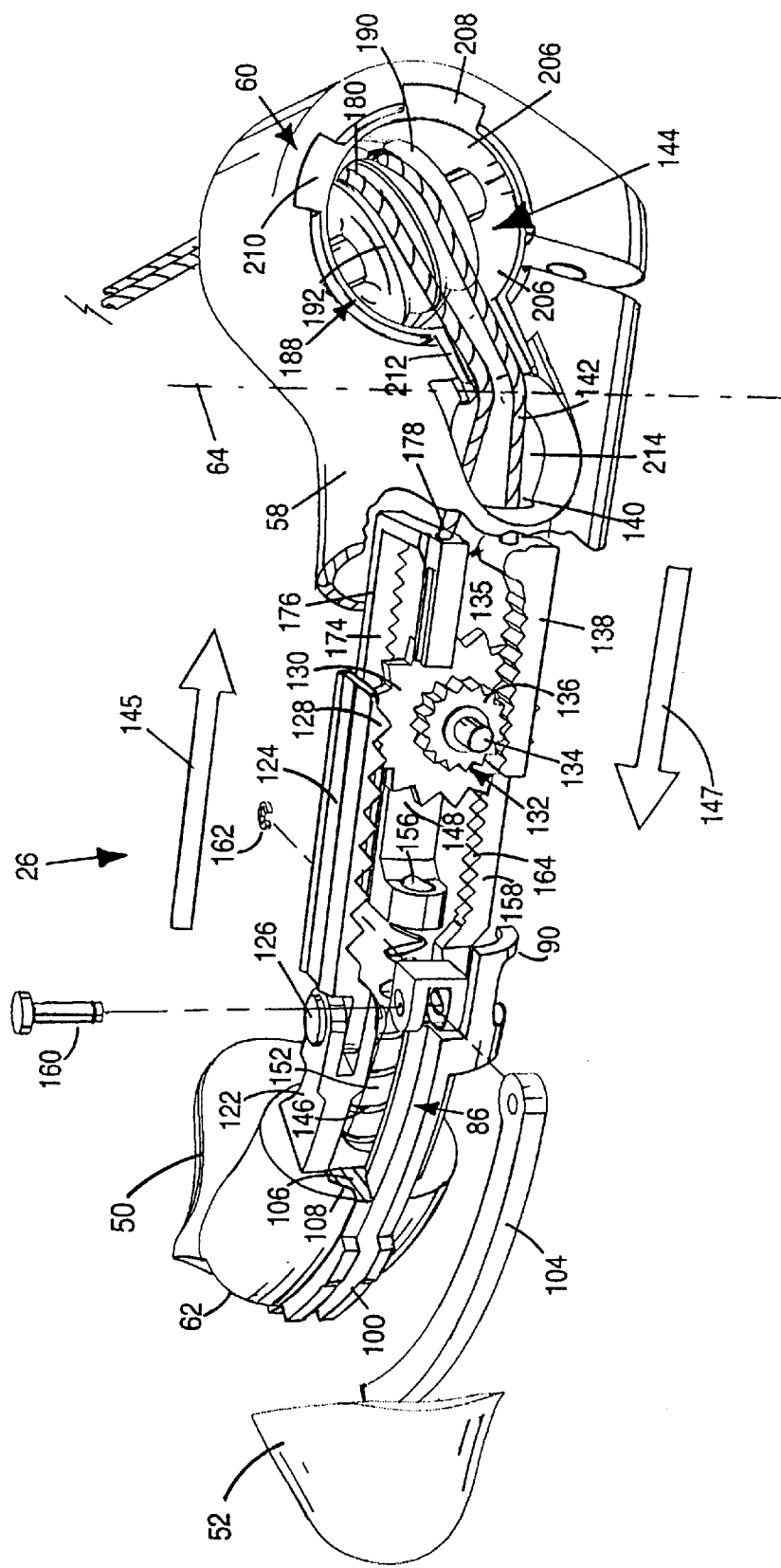
FIG. 4 is a perspective view of the left bar end as seen from an outer side, with portions removed or broken away to show internal structure.

Referring now to FIG. 4, a small diameter brake pinion 136 is attached to and rotates with the large diameter brake pinion 132 about the pinion pin 134. The small diameter brake pinion 134 in turn cooperates with upwardly-extending teeth of a second brake rack in the form of a lower brake rack 138 which is also slidable on corresponding inner guides (shown in section in FIG. 8) of the gear cartridge 110. The lower brake rack 138 has a rearward end attached to a proximate end portion 140 of a speed control cable in the form of a brake cable 142. The brake cable 142 extends through a cable guide arrangement designated generally by reference numeral 144 which receives and guides the brake cable 142 out of the left bar end 26, as will be described in more detail below. A remote end (not shown) of the brake cable 142 is connected to the front brake 32 in a conventional manner.

Thus, depressing the brake lever 50 axially rearwardly towards the brake actuating position 70 causes the upper brake rack 124 to slide rearwardly in the direction of arrow 145 with a corresponding forward movement of the lower brake rack 138 in the direction of arrow 147. The forward movement of the lower brake rack 138 into the gear cartridge 110, in turn, causes the brake cable 142 to be pulled into the cavity of the left bar end 26, away from and thereby actuating the front brake 32.

Referring again to FIG. 3, a biasing member in the form of a return spring 146 is coupled to and biases the brake lever 50 towards the brake neutral position 68. The return spring 146 has a rearward end coupled to the gear cartridge 110 by means of an L-shaped bracket member 148 which snaps onto a complementary bracket retainer portion 150 of the gear cartridge 110. The return spring 146 is slid over a spring slide 152 integral with and extending rearwardly from the brake lever 50. A forward end of the return spring 146 engages an abutment wall 154 of the brake lever 50 (See FIG. 6). When depressing brake lever 50 rearwardly towards the brake actuating position 70, the return spring 146 compresses and the spring slide 152 slides through the return spring 146 and through a circular slot 156 of the L-shaped bracket member 148, entering the gear cartridge 110. Upon release of the brake lever 50, the brake lever 50 travels forwardly under the action of the return spring 146 until the brake lever 50 contacts the end bearing 96 which functions as an end stop to prevent the brake lever 50 from being detached from the actuator 44. The end bearing 96 further functions as a thumb rest during cycling.

Figure 5:
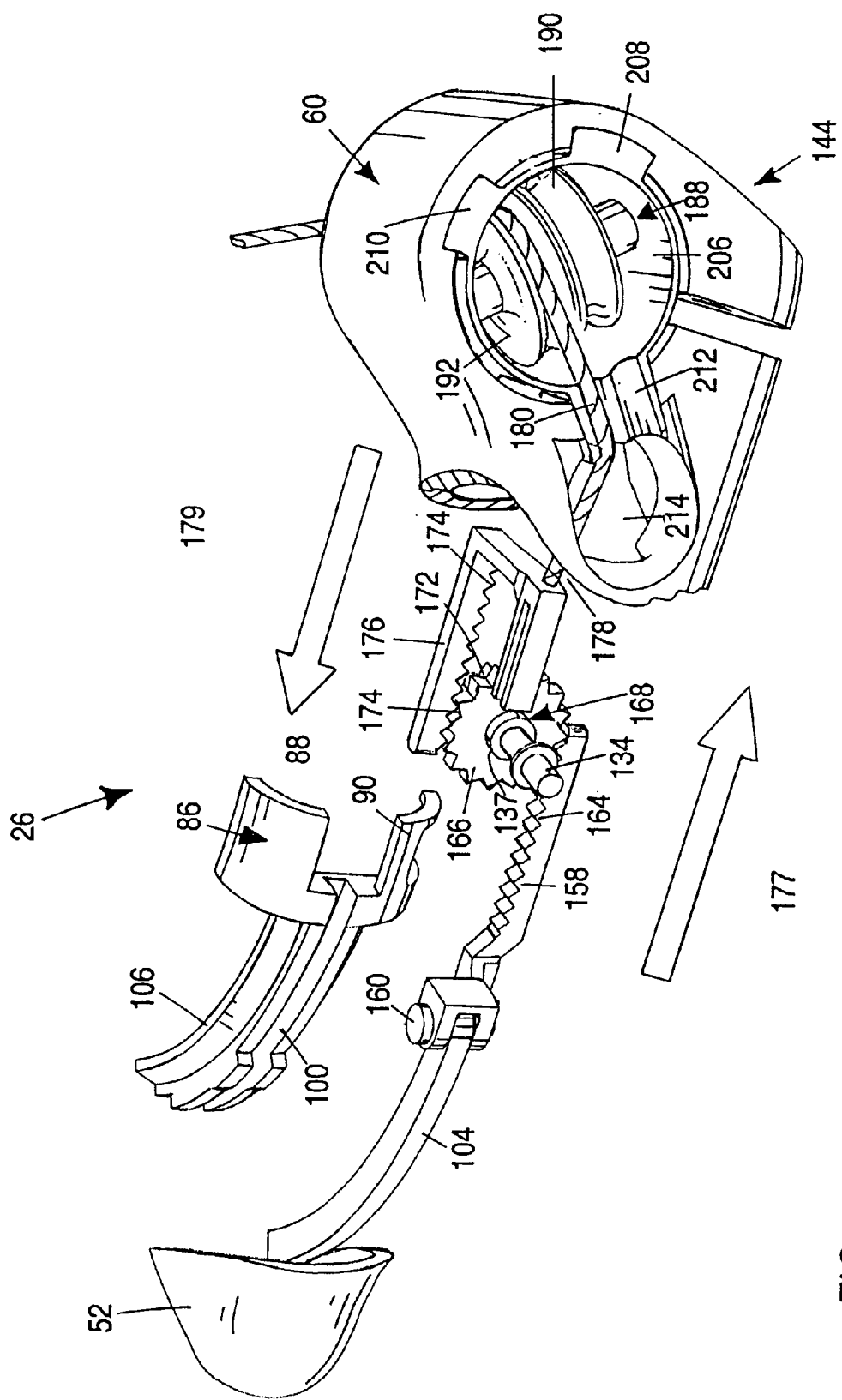
FIG. 5 is a view similar to the view of FIG. 4 of the left bar end with additional portions removed to show other features of internal structure.

The shift lever 52 and shift transmission mechanism function much in the same way as the brake lever 50 and brake transmission mechanism, and will now be described with reference to FIGS. 3 and 5.

Sliding shift lever 52 rearwardly towards the shift actuating position 74 results in a corresponding longitudinally rearward linear travel of a first shift rack in the form of lower shift rack 158 which is pivotally attached to a rearward end of shift lever arm 104 by means of a pivot pin 160 and pin retainer clip 162. The lower shift rack 158 slides within gear cartridge 110 along corresponding inner guides (shown in section in FIG. 8) of the gear cartridge 110 and has upwardly-extending teeth 164 cooperable with a large diameter shift pinion 166 of a shift step-down pinion assembly designated generally by reference numeral 168. The shift step-down pinion assembly 168 is rotatably mounted on pinion pin 134 between bushings 137 and 170. The shift pinion assembly 168 includes a small diameter shift pinion 172 attached to the large diameter shift pinion 166 for rotation therewith on the pinion pin 134. The small diameter shift pinion 172 is cooperable with downwardly-extending teeth 174 of a second shift rack in the form of upper shift rack 176. The upper shift rack 176 slides along corresponding inner guides (shown in section in FIG. 8) of the gear cartridge 110 and is attached rearwardly to a proximate end portion 178 of a shift cable 180. The shift cable 180, like the brake cable 142, is also received and guided by the cable guide arrangement 144 out of the bar end 26. A remote end portion (not shown) of the shift cable 180 is attached to a downshift lever 181 (see FIG. 1) of the left Shimano XTR™ brake and shift lever unit 56 in the normal manner, which results in actuation of the downshift lever 181 when the shift cable 180 is tensioned.

Similar to the brake lever 50, the shift lever 52 can be slid rearwardly in the direction of arrow 177 towards the shift actuating position 74 to cause the shift cable 180 to be pulled into the bar end 26 in the direction of arrow 179, thereby tensioning the shift cable 180 and actuating the downshift lever 181 to downshift the front derailleur 36. The downshift lever 181 itself is normally biased towards a non-actuating position; thus, shifting can only occur when the shift cable 180 is tensioned by sliding the shift lever 52 to the actuating position.

As mentioned above and referring to FIG. 3, the handlebar attachment portion 60 is designed to receive an outer end of the left handlebar 30. The handlebar attachment portion has a generally cylindrical throughbore 182 forming part of the cavity of the bar end 26 having an axis 184 disposed generally transversely to the longitudinal axis 66 (FIG. 2) of the grip portion 58. The throughbore 182 is designed to receive co-axially and clamp onto an outer end of the left handlebar 30 (FIG. 1) using a bolt 186 to tighten the fit such that the grip portion 58 extends transversely to the handlebar 30.

As also mentioned above and with reference to FIGS. 3 and 4, the cable guide arrangement 144 receives and guides the brake and shift cables 142, 180 out of the bar end 26. The cable guide arrangement includes a pulley cartridge fitting designated generally by reference numeral 188 including a main cylindrical portion 206 which houses a brake cable pulley 190 and a shift cable pulley 192 rotatably mounted on a pulley pin 194 between respective bushings 196, 198, 200. The pulley pin 194 is retained in the pulley cartridge 188 by a pair of opposed radially inwardly directed retainers 202, 204.

Referring to FIG. 4, the main cylindrical portion 206 of the pulley cartridge fitting 188 fits into the outer end of the handlebar 30 (FIG. 1) through the throughbore 182 (FIG. 3) with radial projections 208, 210 received in complementary indentations in the outer surface of the handlebar attachment portion 60. A channeled extension 212 of the pulley cartridge fitting 188 rests inside a complementary groove of the handlebar attachment portion 60. The brake and shift cables 142, 180, from respective racks 138, 176, are guided through an opening 214 in the grip portion 58, and along the channeled extension 212 to the respective pulleys 190, 192, which receive and guide the cables 142, 180 out of the bar end 26 through and along the throughbore 182 (FIG. 3). Referring to FIG. 6, the brake and shift cables 142, 180 extend along a portion of a hollow interior of the left handlebar 30, exiting at separate locations spaced inwardly of the left bar end 26. The cables 142, 180 are then guided using conventional means to the front brake 32 and downshift lever 181 (FIG. 1), respectively.

Referring again to FIG. 3, an end cap 215 is used to cover an outer opening in the bar end 26 to protect components of the cable guide arrangement 144.

Figure 8:
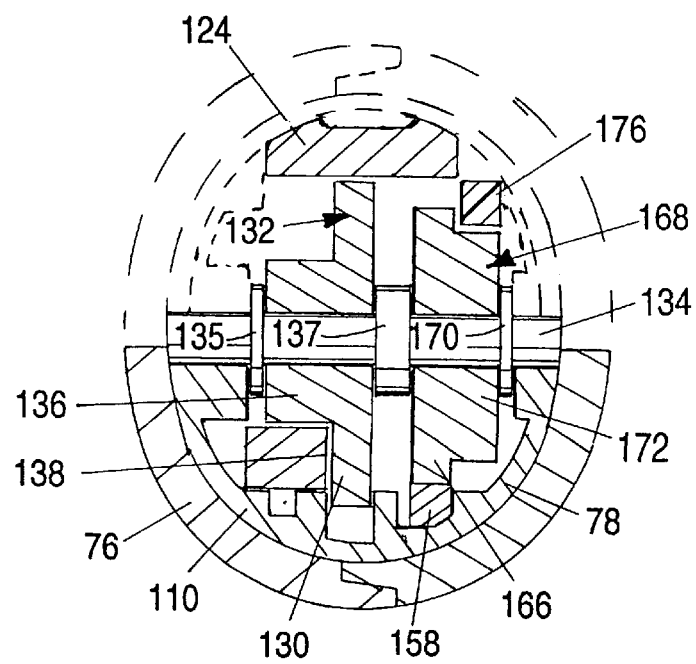
FIG. 8 is a section of the actuator taken along line 8—8 of FIG. 6.

FIG. 8 illustrates the relative size of the pinions in each of the pinion assemblies 132, 168. The large pinion 130 of the brake step-down pinion assembly 132 is approximately twice the size of the small diameter brake pinion 136. In contrast, the large diameter shift pinion 166 is only approximately 1.2 times the size of the small diameter shift pinion 172. Thus, a greater mechanical advantage is conferred by the brake step-down pinion assembly 132 than the shift step-down pinion assembly 168. The absolute sizes of the pinions are selected so that forces which may be normally generated by a cyclist's thumb are sufficient to tension the brake and shift cables 142, 180 enough to cause braking and down-shifting, respectively. In the case of the bicycle 20 (FIG. 1), more force is required to tension the brake cable 142 to effect braking than is required to tension the shift cable 180 to effect shifting.

Referring again to FIG. 1, the right actuator 42 is similar to the left actuator 44 and operates a downshift lever (not shown) of the right Shimano XTR™ brake and shift lever unit 54 which downshifts rear derailleur 38. The right actuator 42 also actuates rear brake 34. Since the components and mode of operation of the right actuator 42 are similar to that of the left actuator 44, the description of the left actuator 44, with obvious modifications, applies to the right actuator 42.

As can be seen in FIG. 6, the handlebars 28, 30 (FIG. 1) of the bicycle 20 include customized exits for the shift and brake cables 180, 142. The exits are formed by drilling a pair of axially-spaced holes in the handlebar 30. The shift and brake cables 180, 142 are fed through respective holes and inserted through respective customized hollow deformable plastic fittings 216, 218 through respective slots (not shown) in and extending the length of the fittings 216, 218. The fittings 216, 218 are then inserted through respective holes in the handlebar 30. Ends of respective shift and brake cable housings (not shown) are pushed into engagement with respective retainer portions 217, 219 of the fittings 216, 218. The shift and brake cables 180, 142 thus extend through the respective shift and brake cable housings (not shown) to the downshift lever 181 (FIG. 1) and front brake 32 (FIG. 1), respectively.

The invention also provides actuators which may be mounted to existing handlebars having no exit openings. An example is an actuator designated generally by reference numeral 220 according to a second preferred embodiment of the invention incorporated into a left bar end 221 and shown in FIG. 9. The actuator 220 is similar to the actuator 44 of the first preferred embodiment in every respect, except for the following.

The actuator includes a cable guide arrangement which receives and guides brake and shift cables 222, 224 out of the bar end 221 through respective openings 226, 228 in the bar end 221 spaced from a throughbore 230 of a handlebar attachment portion 232. The cable guide arrangement includes a brake cable pulley 234 and a shift cable pulley 236 mounted within a modified cartridge 238 (shown partially) in a grip portion 240 of the left bar end 221. The brake and shift cable pulleys 234, 236 are rotatably mounted on a pulley pin 242 between bushings 244, 246, 248. The pulley pin 242, in turn, is retained in slots 250, 252 of cartridge 238.

Figure 9:
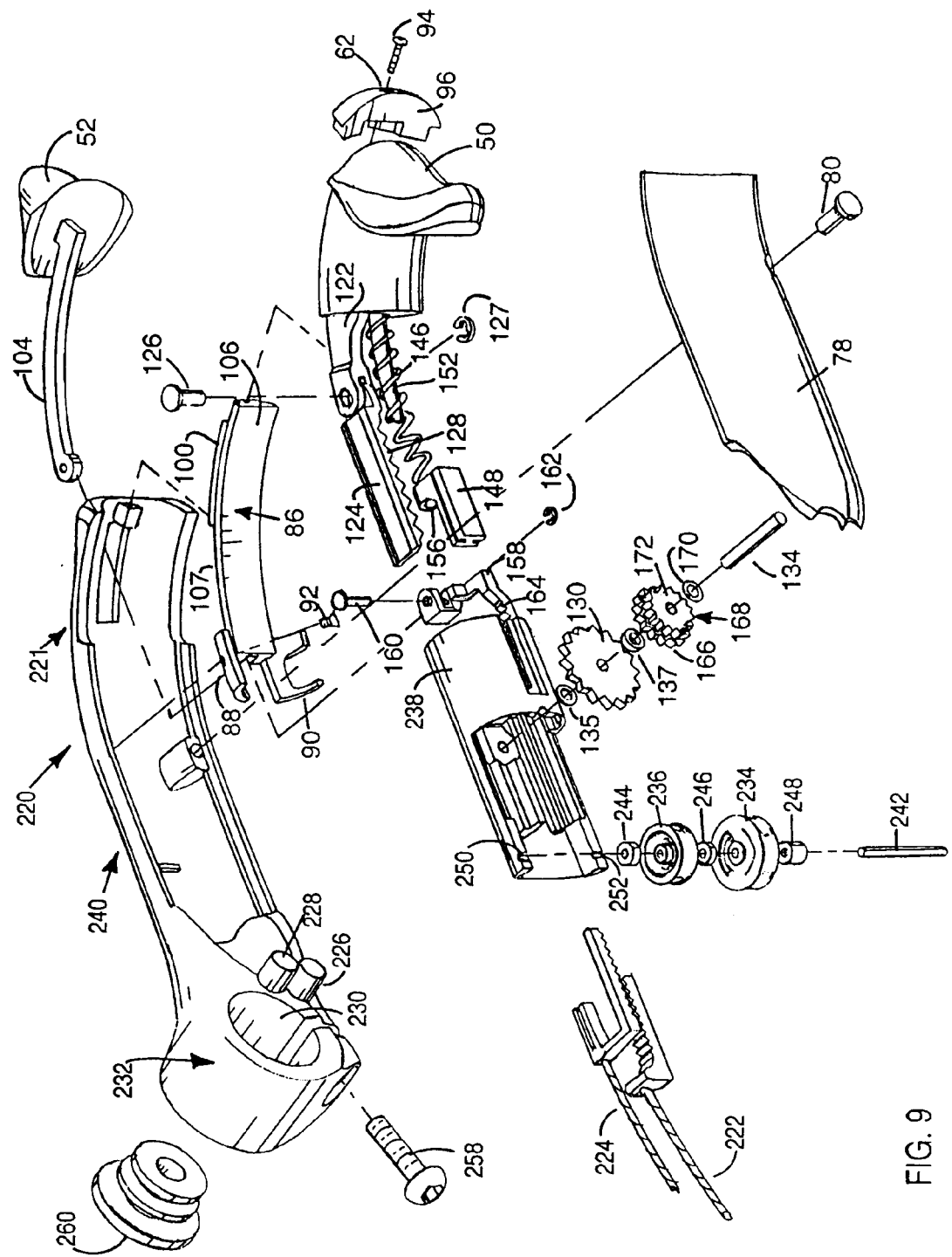
FIG. 9 is a view similar to the view of FIG. 3 of an actuator according to a second preferred embodiment of the invention.
Figure 10:
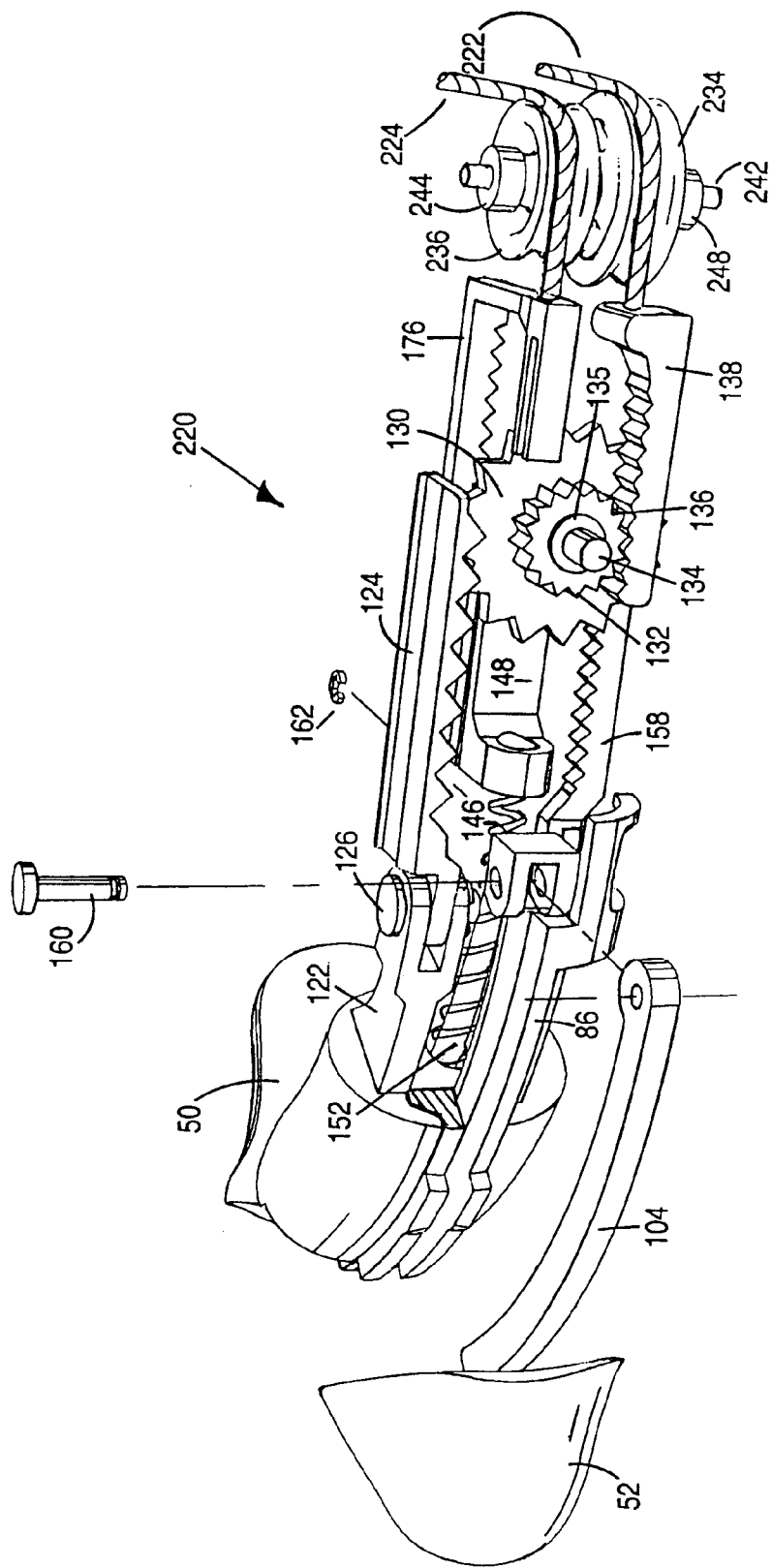
FIG. 10 is a view similar to the view of FIG. 4 of the actuator of FIG. 9.
Figure 11:
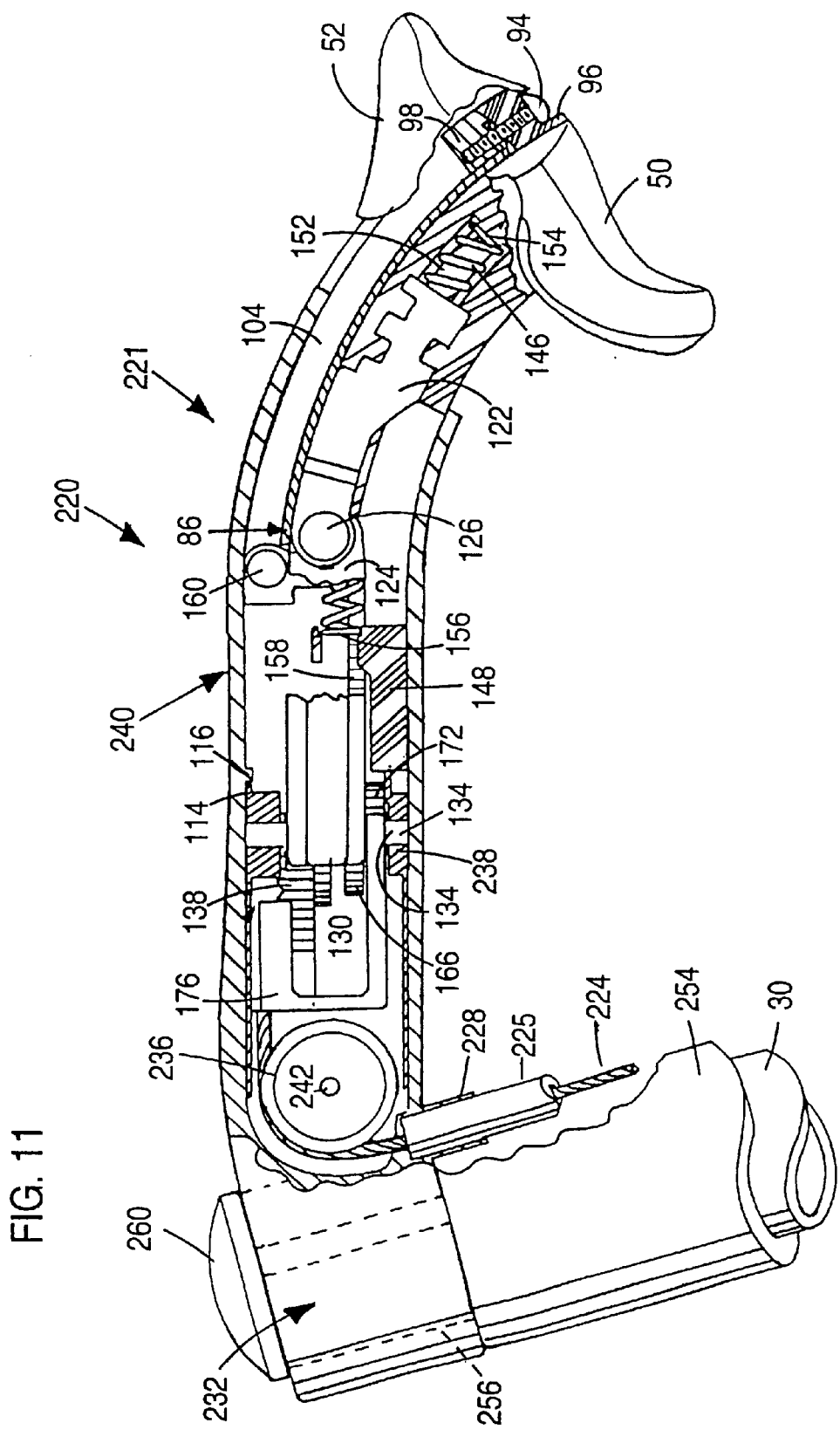
FIG. 11 is a view similar to the view of FIG. 6 of the actuator of FIG. 9.

As can be seen with reference to FIGS. 9 to 11, the brake and shift pulleys 234, 236 receive and guide the respective brake and shift cables 222, 224 out of the bar end through the respective openings 226, 228. The cables 222, 224 therefore run outside of and alongside a left handlebar 254. The cables 222, 224 are guided by conventional means to a front brake (not shown) and a downshift lever (not shown) of a left Shimano XTR™ shift and brake unit (also not shown), respectively as in the case of the first preferred embodiment described above.

Referring to FIGS. 9 and 11, the actuator 220 is mounted to an outer tubular portion 256 of the existing left handlebar 254 by fitting the outer tubular portion 256 through the throughbore 230 of the handlebar attachment portion 232. The fit is tightened using a bolt 258. An end cap 260 is used to cover an outer opening in the throughbore 230.

In the foregoing description of the first and second preferred embodiments of the invention, the shift and brake pulleys may be replaced with any other suitable guides for guiding the shift and brake cables out of the bar end. Further, the brake cable may be coupled to a brake using an adapter such as the adapter disclosed in U.S. Pat. No. 5,094,322 to Casillas (See FIG. 6a of the Casillas patent). Moreover, an actuator according to the invention may be coupled to a lever of a primary conventional brake mounted on a handlebar to actuate the lever, thereby actuating a brake.

Figure 12:
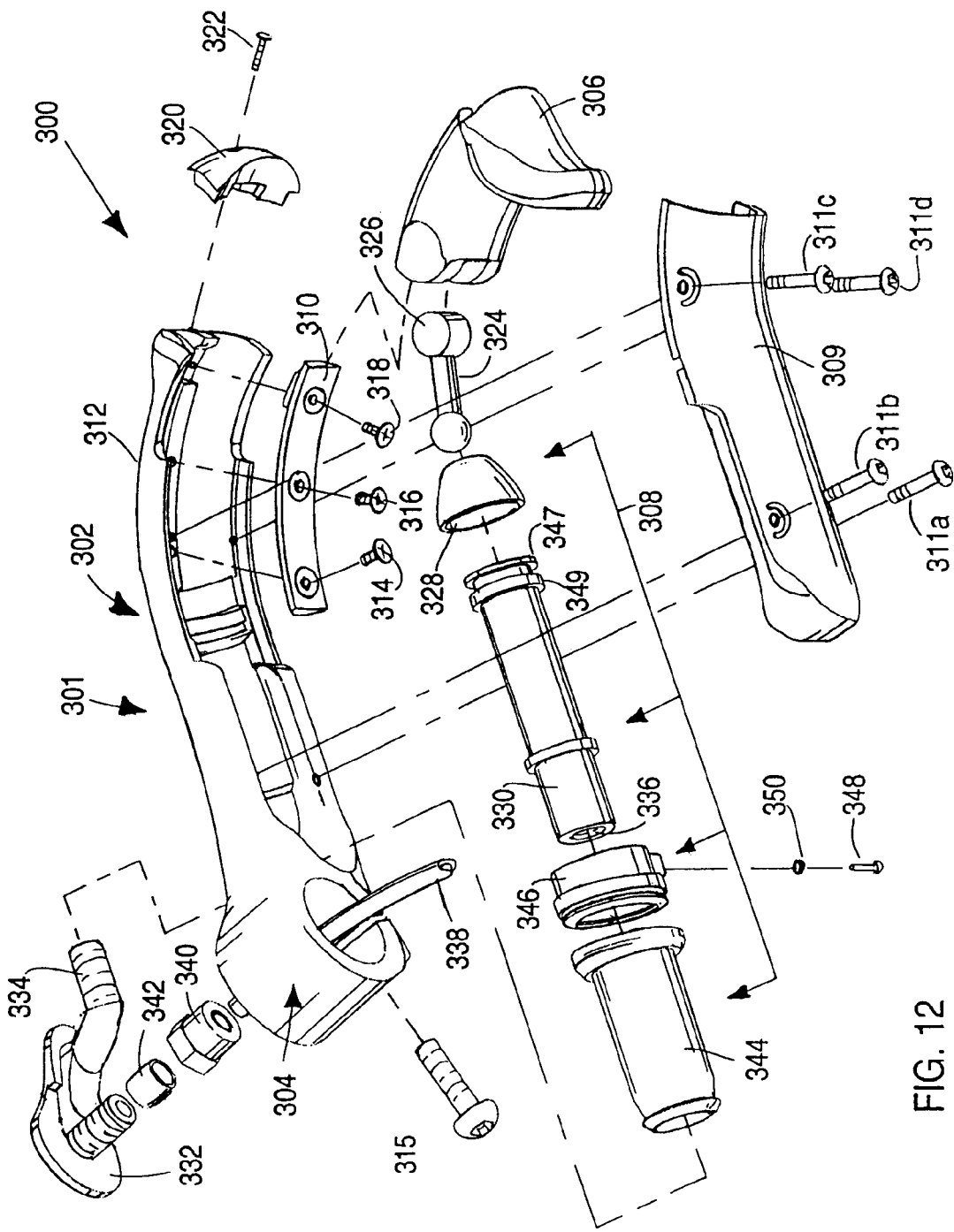
FIG. 12 is a view similar to the view of FIG. 3 of an actuator according to a third preferred embodiment of the invention.

A third preferred embodiment of a hydraulic actuator according to the invention is shown in FIG. 12 and designated generally by reference numeral 300. The actuator 300, incorporated into a left bar end 301, is adapted to form part of an open hydraulic braking system of a bicycle (not shown) including a conventional hydraulic front disc brake (not shown) to be actuated by the actuator 300. A similar actuator may be incorporated into a right bar end to actuate a hydraulic rear disc brake of the bicycle.

The bar end 301 includes a grip portion indicated generally at 302 formed integrally with a handlebar attachment portion indicated generally at 304. A single operating device in the form of a thumb-operated brake lever 306 is slidably mounted to the grip portion 302 for sliding between a brake neutral position at a forward end of the bar end 301 and a brake actuating position axially spaced from the neutral position towards a rearward end of the bar end 301. A transmission mechanism in the form of a conventional hydraulic master cylinder assembly designated generally by reference numeral 308 is received within a cavity of the grip portion 302 between inner and outer housing members 309, 312 which are secured together using bolts 311 a–d. The master cylinder assembly 308 is available from Hayes Brake Inc., whose business address is 5800 West Donges Bay Road, Maquon, Wis., USA, 53092. The master cylinder assembly 308 is coupled to the brake lever 306 and also to the front disc brake, functioning to actuate the front disc brake when the brake lever 306 is in the actuating position.

The brake lever 306, like the brake lever 50 of the first preferred embodiment, is dimensioned to slide longitudinally along a guide rail 310 affixed to an inner surface of an outer housing member 312 using screws 314, 316, 318. An end cap 320 is also affixed to the outer housing member 312 using a screw 322. The end cap 320 limits the forward travel of the brake lever 306 and also functions as a thumb rest while cycling.

A push rod 324 is pivotally attached at a forward end 326 thereof to the brake lever 306 and extends into the master cylinder assembly 308 through a deformable push rod seal 328 of the master cylinder assembly 308. The master cylinder assembly 308 has conventional components including a piston (not shown) slidable rearwardly in a cylinder body 330 containing brake fluid to displace brake fluid out of the master cylinder 308. The piston is coupled to a spring (also not shown) which biases the piston forwardly within the cylinder body 330.

The push rod 324 engages the piston inside the cylinder body 330 and displaces the piston rearwardly when the brake lever 306 is slid to the actuating position, thereby displacing brake fluid out of the master cylinder 308. This, in turn, causes a displacement of brake fluid along a fluid path extending from the cylinder body 330 to the front disc brake.

The fluid path extends through a bypass end cap 332 having a tubular threaded connector 334 received inside a complementary threaded bore 336 of the cylinder body 330.

The fluid path continues into a hose 338 connected to the bypass end cap 332 using a hose nut 340 and a compression sleeve 342. The hose 338 has a remote end portion (not shown) connected to the front disc brake in the conventional manner, and the fluid path extends to the front disc brake through the hose 338.

Thus, sliding the brake lever 306 to the actuating position actuates the hydraulic front disc brake. Upon release of the brake lever 306, the return spring inside the cylinder body 330 biases the piston and therefore the brake lever 306 back to the brake neutral position.

The master cylinder assembly 308 is equipped with a bladder 344 for retaining excess brake fluid flowing out of the open cylinder body 330 via openings (not shown) in the cylinder body 330. The push rod seal 328 has an inwardly directed lip 345 which fits over a first flange 347 of the cylinder body 330 and resides between the first flange 347 and a second flange 349. The bladder retainer 344 has a forward end engaging a rearward end of the bladder retainer cap 346 to form a two-piece unit which slides over the cylinder 330 with a forward portion of the bladder retainer cap 346 engaging a rearward surface portion of the second flange 349. The bladder retainer cap 346 includes a fluid passage (not shown) through which brake fluid and air in the open hydraulic system may escape. A bleed screw 348 and rubber washer 350 are used to selectively open or close the fluid passage to a flow of fluid therethrough.

Figure 13:
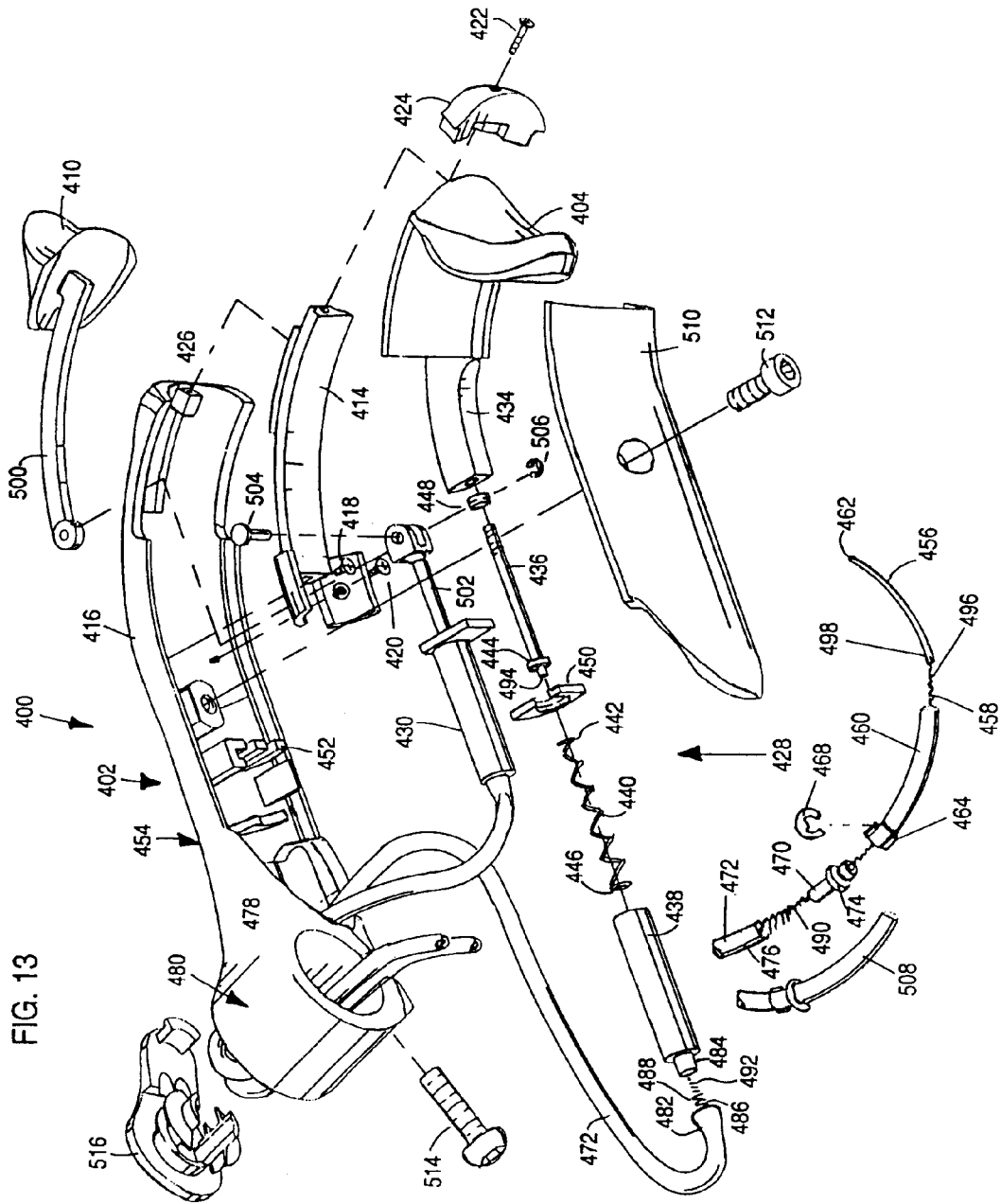
FIG. 13 is a view similar to the view of FIG. 3 of an actuator according to a fourth preferred embodiment of the invention.

Referring to FIG. 13, a fourth embodiment of an actuator according to the invention for actuating a front derailleur of a bicycle and designated generally by reference numeral 400 is shown. Again, the actuator 400 is incorporated into a left bar end designated generally by reference numeral 402. A similar actuator may be incorporated into a right bar end to activate a rear derailleur of the bicycle.

Figure 14:
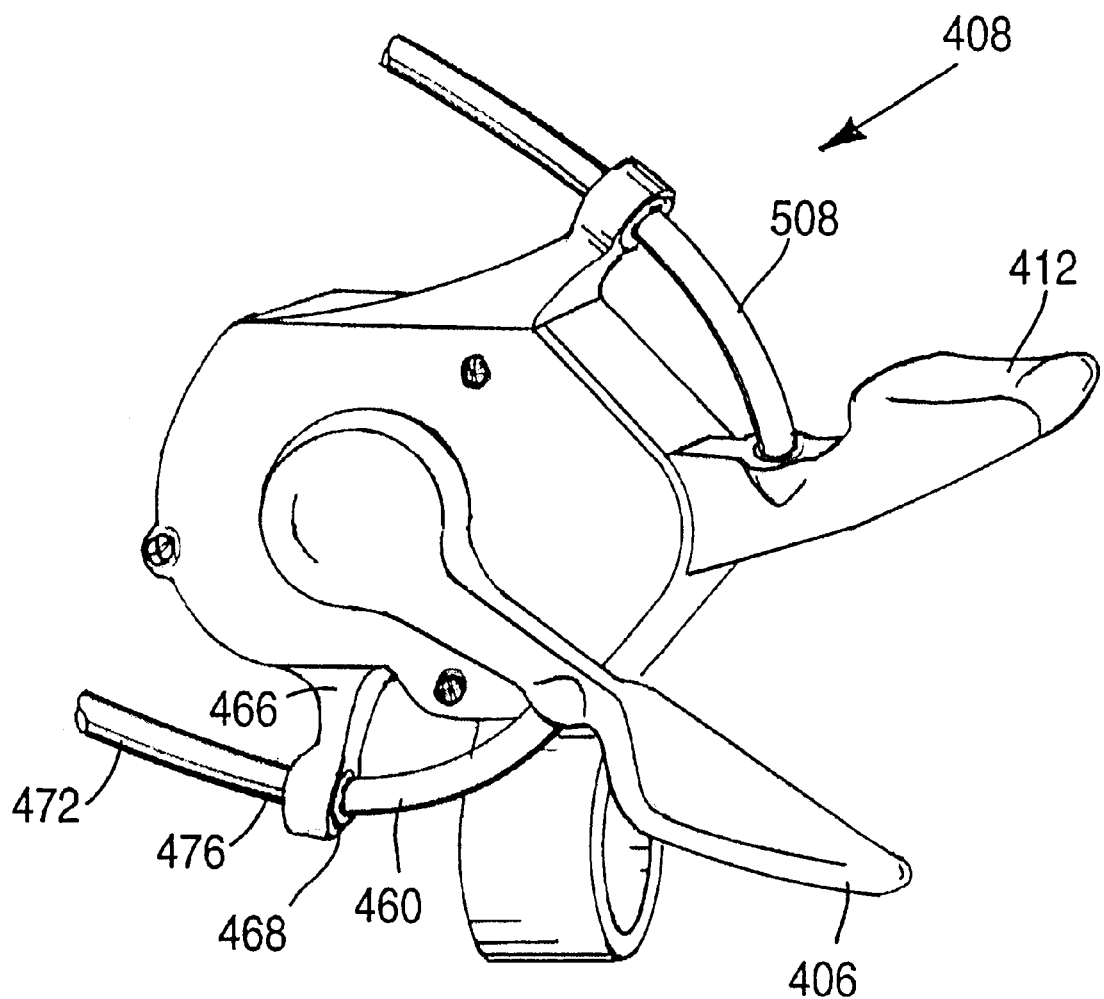
FIG. 14 is a perspective view as seen from a bottom of a simplified Shimano XTR™ shifter modified to receive push rods of the actuator of FIG. 13.

Referring to FIGS. 13 and 14, the actuator includes an upshift operating device 404 for actuating an upshift lever 406 of a modified Shimano XTR™ shifter designated generally by reference numeral 408. A downshift operating device 410 is used to actuate a downshift lever 412 of the shifter 408. Each of the operating devices 404, 410 is slidable along a guide rail 414 which is secured to an outer housing member 416 of the bar end 402, using screws 418, 420. The connection is reinforced by a screw 422 which extends through an end cap 424, the guide rail 414, and a screw receiver 426, thereby securing the end cap 424 and the guide rail 414 to the outer housing member 416.

The operating devices 404, 410 are slidable between respective neutral positions at a forward end of the bar end 402 and respective actuating positions axially spaced rearwardly from the neutral positions.

An upshift transmission mechanism indicated generally at 428 and a downshift transmission mechanism indicated generally at 430 are received within a cavity of the bar end 402 and coupled to respective operating devices 404, 410, as will be described. The transmission mechanisms 428, 430 are also coupled to respective upshift and downshift levers 406, 412 and are adapted to actuate the levers 406, 412 when the operating devices 404, 410 are in the actuating positions.

The upshift transmission mechanism 428 and means of coupling the upshift transmission mechanism to the upshift lever 406 is similar to the downshift transmission mechanism 430 and means of coupling the downshift transmission mechanism 430 to the downshift lever 412, respectively. Thus, only the former will be described in detail.

The upshift operating device 404 includes a flexible, rearwardly-extending lever arm 434 to which is secured a slider in the form of a push rod 436 of the upshift transmission mechanism 428. The push rod 436 is thus slidable longitudinally with the upshift operating device 404, being disposed at a first position when the operating device 404 is in the neutral position, and being displaceable longitudinally rearwardly towards a second position intermediate the first position and a rearward end of the bar end 402 when the operating device 404 is in the actuating position. The push rod is slidable between the first and second positions within a slider receiver in the form of a push rod cylinder 438. A biasing member in the form of a return spring 440 is disposed within the push rod cylinder 438 and has a forward end engaging a rearward side of a bearing flange 444 of the push rod 436, and a rearward end 446 engaging a rearward inner shoulder (not shown) of the push rod cylinder 438. The return spring 440 acts to bias the push rod 436 towards the first position.

Forward travel of the push rod 436 is limited by an abutment ring 448 secured by screw threads within the push rod cylinder 438. The return spring 440 biases the push rod 436 forwardly until a forward side of the bearing flange 444 engages the abutment ring 448 within the push rod cylinder 438.

A mounting flange 450 is secured by screw threads to an outer surface of a forward end of the push rod cylinder 438. The mounting flange 450 is used to secure the upshift transmission mechanism 428 in place within a grip portion 454 of the bar end 402, being mounted to a complementary receiver 452 formed integrally with an inner surface of the outer housing member 416.

An upshift operating member in the form of a rigid push wire 456 is located outside of the bar end 402 and coupled to the push rod 436 by way of a small-coiled translation spring 458, as will be described.

Referring to FIGS. 13 and 14, the push wire 456 is contained in a tubular rigid push wire housing 460 with a remote end 462 of the push wire 456 seated in a complementary groove (not shown) provided in the upshift lever 406 of the shifter 408. The push wire 456 is slidable out of the push wire housing 460 to depress the upshift lever 406 thereby upshifting the front derailleur. The push wire housing 460 has a proximate portion 464 dimensioned to fit in a complementary retaining bore of a bored extension 466 such that rotation of the push wire housing about a longitudinal axis thereof is prohibited. Further, the retaining bore is dimensioned to prevent the push wire housing 460 from moving towards the upshift lever 406. The push wire housing 460 is also prevented from sliding away from the upshift lever 406 through the bore of the bored extension 466 by a clip 468 which is clamped around an indented periphery of the push wire housing 410 adjacent to the proximate portion 464.

A flanged tubular coupling 470 couples the push wire housing 460 to a flexible spring housing 472. A remote end 476 of the spring housing bears against a flange 474 of the flanged coupling 470.

The spring housing 472 extends from the remote end 476 thereof into a left handlebar through an opening in the left handlebar, into a throughbore 478 of a handlebar attachment portion of the bar end 402 designated generally by reference numeral 480, through a grooved outer channel (not shown) of the bar end 402, and into the grip portion 454, where a proximate end 482 of the spring housing 472 is pushed onto and in engagement with a reduced diameter rearward cylindrical portion 484 of the push rod cylinder 438.

Extending through the full length of the flexible spring housing 472 is a large coiled bearing spring 486 having a proximate end 488 secured to an inner wall of the cylindrical portion 484 and a remote end 490 secured to an inner wall of the flanged tubular coupling 470. The bearing spring 486 acts as a bearing for the smaller coiled translation spring 458 which extends from the push rod 436 through the bearing spring 486, through the flanged tubular coupling 470, and to the push wire 456. The translation spring has a proximate end 492 which fits into a grooved rearward end 494 of the push rod 436 and a remote end 496 which fits into a grooved proximate end 498 of the push wire 456.

Thus, sliding the upshift operating device 404 to the actuating position causes an axially-rearward displacement of the push rod 436 within the push rod cylinder 438. The translation spring 458 is correspondingly displaced through the housings 472, 460, to push the push wire 456 out of the push wire housing 460 thereby depressing the upshift lever 406 to upshift the front derailleur.

The downshift operating device 410 is similarly coupled to the downshift lever 412. The downshift operating device 410 has a downshift lever arm 500 which is pivotally attached to a corresponding push rod 502 using a pin 504 and pin retaining clip 506. Sliding the downshift lever 410 rearwardly to the actuating position displaces the attached push rod 502 rearwardly to displace a translation spring (not shown) which, in turn, pushes a rigid push wire (not shown) out of a push wire housing 508, thereby actuating downshift lever 412.

In the case of both operating devices 404, 410, release of the operating devices from the respective actuating positions results in their return to the respective neutral positions under the action of the respective return springs in the respective push rod cylinders.

As in the case of the other embodiments, the downshift and upshift transmission mechanisms 430, 428 are housed in a hollow cavity of the bar end 402 between the outer housing member 416 and an inner housing member 510 secured to the housing member using a bolt 512. Similarly, the handlebar attachment portion 480 clamps onto an outer tubular end of a left handlebar, the fit being tightened using a tightening bolt 514. An end cap 516 is used to cover an outer opening in the bar end 402 to protect the inner components of the actuator 400 against damage.

While the actuators have been described as being incorporated into elongate members in the form of bar ends which are attached to outer ends of handlebars and which extend forwardly of the handlebars, it should be understood that the invention provides an actuator incorporated into an elongate member which may form any part of a handlebar system, which part provides an alternative grip position to a first grip position at which conventional brake and/or shift levers are mounted. For example, an actuator according to the invention may be incorporated into a bar end which is integrally formed with a handlebar. Further, the bar end may extend upwardly from the handlebar or curve forwardly and then inwardly so as to include a portion which is parallel to an adjoined handlebar. Thus, it is not intended to limit the invention to the particular structure of the handlebar system described herein.

The foregoing description is by way of example only and is not intended to limit the scope of the invention as defined by the appended claims.

What is claimed is:

1. An actuator for actuating a cycle speed change member, said speed change member consisting of one of a derailleur and a brake, said actuator being incorporated into a generally cylindrical elongate member adapted to form part of a cycle handlebar system, said elongate member having a cavity, first and second ends, and a longitudinal axis extending between said first and second ends, said actuator including an operating device slidably mounted to said elongate member for sliding between a neutral position and an actuating position axially spaced from said neutral position;

a transmission mechanism received within said cavity of said elongate member and coupled to said operating device, said transmission mechanism being adapted to be coupled to said speed change member and to actuate said speed change member when said operating device is in said actuating position; and a speed control cable having a proximate end portion coupled to said transmission mechanism and a remote end portion outside said elongate member adapted to be coupled to said speed change member;

wherein said transmission mechanism is adapted to pull said speed control cable into said cavity of said elongate member when said operating device is in said actuating position, said transmission mechanism including a rack and pinion assembly having a first rack coupled to said operating device, a pinion system cooperable with said first rack, and a second rack cooperable with said pinion system, said second rack being coupled to said speed control cable.

2. An actuator according to claim 1 wherein said elongate member is a bar end having a grip portion including said first end;

a handlebar attachment portion including said second end, said handlebar attachment portion being coupled to said grip portion and having a generally cylindrical throughbore, said throughbore having an axis disposed transversely to said longitudinal axis, said handlebar attachment portion being thereby adapted to co-axially receive an outer end of a handlebar of a cycle such that said grip portion extends transversely to said handlebar; and a cable guide arrangement for receiving and guiding said speed control cable out of said bar end.

3. An actuator according to claim 2 wherein said cable guide arrangement includes a pulley mounted within said throughbore, said pulley receiving and guiding said speed control cable out of said bar end through and along said throughbore.

4. An actuator according to claim 2 wherein said cable guide arrangement includes a pulley mounted within said grip portion and an opening in said bar end spaced from said throughbore, said pulley receiving and guiding said speed control cable out of said bar end through said opening.

5. An actuator according to claim 2 wherein said operating device is a thumb lever to be slidably displaced by a thumb of a rider.

6. An actuator according to claim 5 wherein said neutral position is at said first end.

7. An actuator according to claim 6 further including a biasing member coupled to said operating device for biasing said operating device towards said neutral position.

\* \* \* \* \*